United States Patent [19]

Minks

[11] Patent Number: 5,018,493
[45] Date of Patent: May 28, 1991

[54] ENGINE SPARK CONTROL APPARATUS

[76] Inventor: Floyd M. Minks, 2700 Partin Settlement Rd., Kissimmee, Fla. 32743

[21] Appl. No.: 548,141

[22] Filed: Jul. 3, 1990

Related U.S. Application Data

[60] Continuation of Ser. No. 337,014, Apr. 12, 1989, Pat. No. 5,003,946, which is a division of Ser. No. 226,298, Jul. 29, 1988, Pat. No. 4,821,703, which is a continuation of Ser. No. 112,100, Oct. 22, 1987, Pat. No. 4,774,924.

[51] Int. Cl.$^5$ ............................................. F02P 5/155
[52] U.S. Cl. ..................................... 123/335; 123/618
[58] Field of Search ................ 123/335, 416, 418, 599, 123/602, 618, 648, 651, 652

[56] References Cited

U.S. PATENT DOCUMENTS

| | | | |
|---|---|---|---|
| 3,566,188 | 2/1971 | Minks | 123/599 X |
| 3,802,400 | 4/1974 | Minks | 123/335 |
| 4,359,038 | 11/1982 | Xiberas | 123/651 X |
| 4,402,298 | 9/1983 | Morita | 123/618 X |
| 4,404,952 | 9/1983 | Fujimoto et al. | 123/618 X |
| 4,411,245 | 10/1983 | Tanaka et al. | 123/618 X |
| 4,491,122 | 1/1985 | Piteo | 123/651 X |
| 4,528,970 | 7/1985 | Fujimoto | 123/618 X |
| 4,537,175 | 8/1985 | Gerry | 123/651 X |
| 4,644,927 | 2/1987 | Okuda | 123/618 X |
| 4,664,080 | 5/1987 | Minks | 123/335 |
| 4,697,560 | 10/1987 | Umehara | 123/335 |
| 4,774,924 | 10/1988 | Minks | 123/651 X |

*Primary Examiner*—Willis R. Wolfe

[57] ABSTRACT

This disclosure relates to apparatus for operating a combustion engine by controlling the spark ignition voltage to said engine. Said control is created by the application of two opposing currents to the input of an amplifying device which is used to selectively shunt a constant current source away from the control electrode of a second amplifying device connected to control the formation of said ignition voltage.

16 Claims, 1 Drawing Sheet

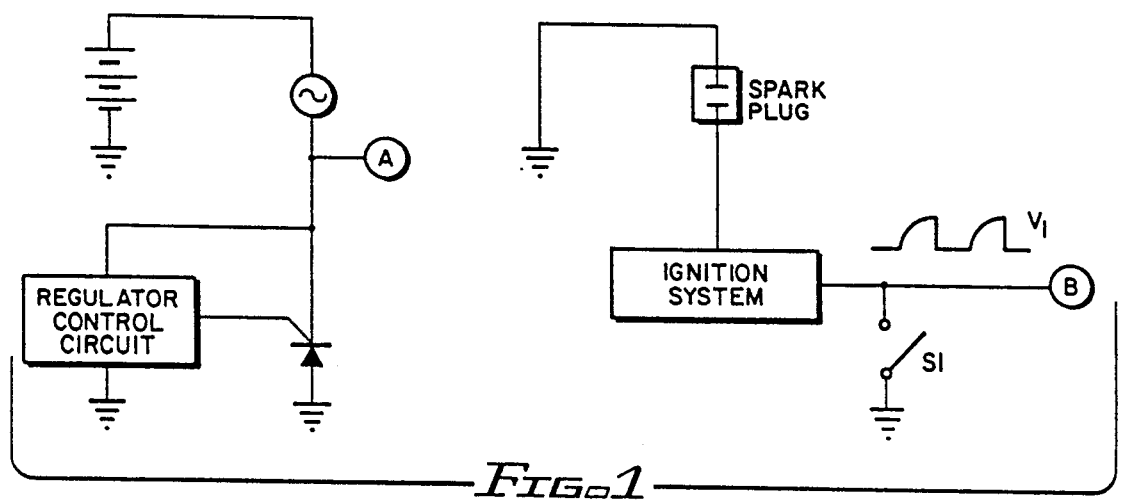
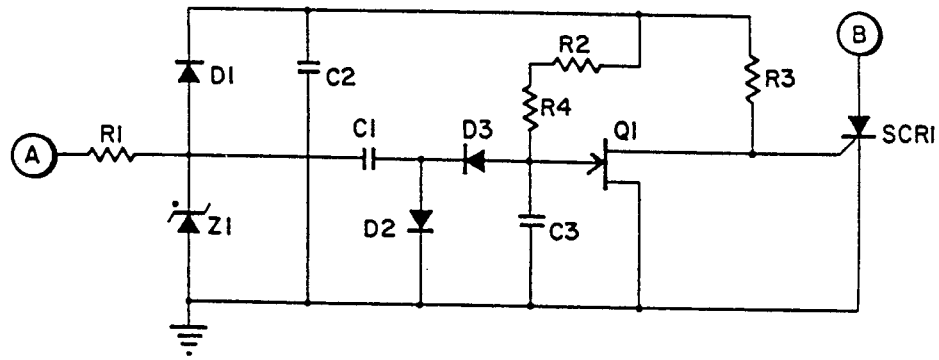
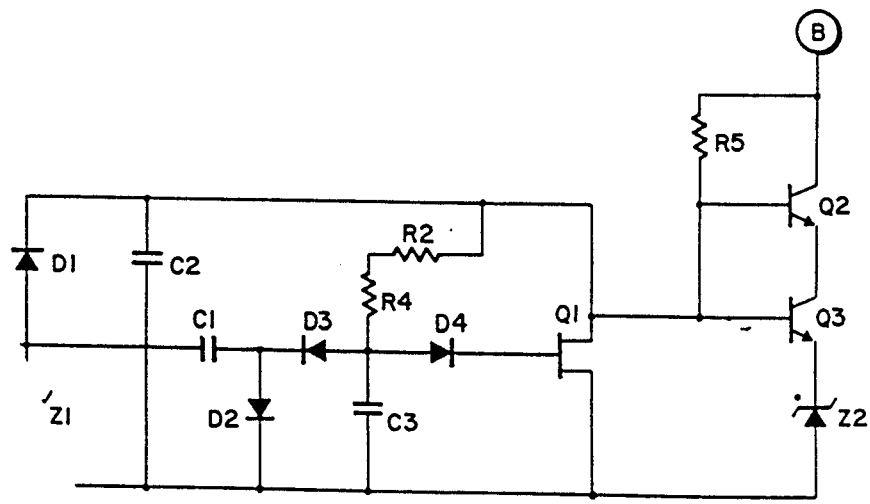

ENGINE SPARK CONTROL APPARATUS

This application is a continuation of application Ser. No. 7/337,014, filed Apr. 12, 1989, now U.S. Pat. No. 5,003,946, which is a division of application Ser. No. 07/226,298 filed July 29, 1988, now U.S. Pat. No. 4,821,702, which is a continuation of application Ser. No. 07/112,110 filed Oct. 22, 1987, now U.S. Pat. No. 4,774,924.

This invention relates to an electronics system for controlling the formation of a spark used to ignite a fuel air mixture in an engine and creates or removes said spark in response to electrical signals available within the battery charging and or ignition system of said engine.

BACKGROUND OF THE INVENTION

Systems for selectively inabling or disabling the ignition to combustion engines to correspond with various operating conditions or to supply desired ignition to the engine under all allowable normal operating conditions have been known in the art. Two examples would be applicants Pat. Nos. 3,802,400 and 4,664,080. A thorough understanding of the teaching of those patents is essential to the proper understanding of this application since the concepts clearly describe therein will not be herein repeated. Those patents are incorporated herein by reference.

It is an object of this invention to increase the accuracy over the greatest range of engine operating conditions while maximizing the reliability, and minimizing the cost of components within the system. An operating condition of particular concern is the temperature range over which the system must operate. It should be realized that with the change in the state of the art of combustion engines and the more compact spaces into which they are sometimes mounted compared to art of even a few years ago, that the temperature extremes to which engine associated electronics are exposed has increased.

Another object of this invention is to reduce the number of connections of this control apparatus to the existing vehicle and ignition system wiring.

DESCRIPTION OF THE DRAWINGS

The above and other objects, and features of the invention will become apparent from the following detailed description taken in conjunction with the accompanying drawing in which:

FIG. 1 is a diagram of a portion of a currently known vehicle wiring system.

FIG. 2 is a circuit diagram of a preferred embodiment of this invention showing connection points to the circuit of FIG. 1.

FIG. 3 is a circuit diagram of another version of this invention.

DETAILED DESCRIPTION OF PREFERRED EMBODIMENT

FIG. 1 is a portion of a wiring diagram for a three or four wheeled recreational vehicle of the type presently being produced in the industry. Points labeled A and B have been added to show the connection to similarly labeled points on FIG. 2. Only the portions of the electrical wiring already on the vehicle that connect to and interact with circuit of the present invention are shown. The alternator in FIG. 1 is typically a permanent magnet alternator driven by the crank shaft of the engine not shown. It supplies power for the electrical systems such as for lighting and starting on the vehicle. The charging of the battery by the alternator is controlled by the SCR and regulator control circuit shown in FIG. 1. It is desirable to place the SCR with its anode grounded because of the advantageous heat sinking of the SCR. This results in neither alternator lead grounded making sensing of alternator voltage for speed measuring purposes more difficult. This type of battery charging regulator is shown in applicant's U.S. Pat. No. 4,490.779. However, one skilled in the art could also adapt this control apparatus to other types of regulators which might be used in these vehicles. Since one side of the alternator is permanently connected to the battery, the voltage at point B will be the alternator voltage superimposed upon the battery voltage. If the alternator is of the permanent magnet type both the frequency and the open circuit voltage of the alternator will change linearly with engine speed. The negative portion of the alternator waveform from point B to ground will be selectively equipped by the SCR of FIG. 1 in response to the amount of charge needed by the battery, however the positive portion of that waveform will remain essentially at its open circuit value. The ignition system shown typically derives its power from a separate winding on the alternator, however, could derive its power from another source such as the battery. Switch one is the existing switch which is used to short circuit an ignition system lead to ground to stop the engine. The wave form shown in C1 indicates that the ignition stop wire has a pulsating DC voltage going positive with respect to ground. An ignition system of this type is shown in applicant's U.S. Pat. No. 3,566,188. Wherein the cathode of diode 16 would be point B. If it is desired to have the control circuit of this invention limit engine speed only under certain conditions a switch could be placed between point A of FIG. 1 and the corresponding connection point A of FIG. 2. Without such a switch the control apparatus would be operable at all times to prevent destructive overspeed of the engine in case the load was lost. Two possible examples of switches in the lead connecting the 2 point A's would be a switch closed when the transmission was put in reverse to limit the speed of the vehicle in reverse only, or a switch closed when the manually operated throttle level was released thus slowing the engine down to the present limit even if the connection linkage, normally a throttle cable, from the hand actuated lever to the carburetor or other engine power control, was stuck or frozen in the open position. Similarly, appropriate switching could be used to accomplish both the previously mentioned functions.

FIG. 2 shows a circuit diagram of an electric control apparatus constructed in accordance with this invention. FIG. 3 shows another version of this invention also useable above the maximum temperature capabilities of SCR type devices. Points labeled A and B are to be connected directly to the similarly labeled points of the existing vehicle wiring system of FIG. 1, with the option all inclusion of the additional switch discussed previously. The waveform at point A is the alternator voltage superimposed on the battery voltage, with a portion of the negative going part of the waveform clipped depending on the state of the charge of the battery. There is a small but finite interaction between the clipping of this negative portion of the waveform and the positive portion of the waveform leading to some loss in accuracy of the previously referred to patents. In the present invention this waveform is applied effectively to resistor R1 and zener diode Z1 in series to ground. Typical value stated for understanding purposes only would be a 3 K ¼ watt resistor for R1 and a 18 volt ¼ watt zener for Z1. It can be seen by one skilled in the art that the operating condition of Z1 is a very conservative level, neither near the knee of the zener characteristic, or at excessively high wattage. Many circuits known in the art operate zener diodes in the input (typically base) circuit of amplifying devices that requires very critical selection of the zener diodes. The voltage across Z1 will then be a rectangular waveform clipped in the positive direction at the zener voltage, that is approximately 18 volts, and in the negative direction at the forward voltage drop of the zener. (approximately 0.7 volt) The voltage across this zener therefore can be considered as being equivalent of the AC voltage source shown as A-1 in previously referred to patent No. 3,802,400. The waveform across Z1 has the advantage of being much more stable with variations and alternator load and other factors, such as alternator tolerance or temperature, compared to connecting this point directly to the alternator. The positive portion of this waveform is rectified with the diode D1, and capacitor C2 is thus charged to approximately +17.3 volts DC. The component types would be a 1 MF capacitor for C2, and a type 1N4148 diode for D1. Capacitor C2 thus serves to filter this voltage to produce a DC level which eliminates the need for the separate connection shown with a plus sign in the figure of patent No. 3,802,400. This voltage is then applied through resistor R3 to the gate of SCR1. Typical value of R3 might be 300,000 ohms allowing approximately 50 microamps of current to flow to the gate of SCR1. This current is sufficient to turn on devices readily available in the commercial market place. Since the voltage to turn SCR1 is very low compared to the voltage on capacitor C2, the current flowing through R3 can be considered as a constant current source as viewed from the SCR gate and cathode terminals. Transistor Q1, shown as a N channel junction field effect transistor, is connected from the gate terminal of SCR1 to ground. As is known, a device of this type is on or in the conducting state when a positive or 0 voltage is preset from the gate to the source terminals, and turns off when a negative voltage of know ampitude is applied to the gate terminal with respect to the source terminal Thus current flowing through resistors R2 and R4 is in the direction to bias Q1 to conduct thus shunting the current flowing resistor R-3 away from the gate of SCR1 and to ground. This is particularly advantageous at very high operating temperatures since the effective impedance from the drain to the source of Q1 when in the on state is lower that could feasibly be used for resistor R3 in patent No. 3,802,400 or resistor R5 in patent No. 4,664,080, thus allowing an improvement in high temperature stability of the circuit Capacitor C1, diodes D2, and D3, serve as a frequency to voltage or current converter as is known, and is also pointed out in patent No. 3,802,400 ,and will not be further described here. It should be realized that diodes D2, and D3 need to be of a low leakage type. Capacitor C1 might typically be 4,000 pf. Capacitor C3 serves to filter or average the opposing outputs of the positive current through R2 and R4 and the negative current produced by the network of C1 ,D3 and D4. The value chosen will depend on the response speed needed, 0.1 MF could be typical out is stated as are all preceding values only for understanding the circuit. Resistors R2 and R4 are shown as two components in series as an easy means of accurately calibrating the circuit. For instance, R4 might be a 1.3 megohm resistor it would be the same in all units in a given production run. R2 might vary from near 0 to 200,000 ohms selected either on an individual basis to compensate for variations in other components such as primarily C1 and Q1. C1 and Q1 could alternately be sorted on a lot basis and a R2 value selected for each such lot. The circuit of this invention has appreciably better accuracy than the circuit of patent No. 4,664,080 since it senses the frequency and not the voltage of the alternator, thus alternator tolerances are almost completely removed. It also has an appreciable improvement in accuracy over the circuit of patent No. 3,802,400 since in that patent both the base emitter drop of transistor T and the gate cathode voltage to fire the SCR are effectively in series with the control currents where in the present application the source and gate of transistor Q1 are directly across the output or summing point of those opposing currents. FIG. 3 shows a modification of this invention suitable for extremely high temperature operation. Similar functioning components have the same designations as in FIG. 2 Stable operation of this version of this invention has been observed to over 165 C. SCR1 is replaced by a PNP transistor Q2, and a NPN transistor Q3, and a resistor R5. Q2 and Q3 are connected in a known configuration giving junctions in the PNPN configuration typical of a SCR but eliminating the resistance within the internal gate region of a SCR. Resistor 5 establishes a preslected collector current, and therefore, approximate emitter current for Q3 at the turn on point of the combination. This regenerative turn on point occurs because the output or collector of Q2 is connected to the input or base of Q3 and the output of Q3 is connected to the input of Q2. One skilled in the art could of course substitute other semiconductor devices. The current at the regenerative turn on point is predictable based on the base emitter voltage required to turn on Q2 and the value of R5. Thus the operating point of zener diode Z2 is controlled at a preselected level. The voltage across Z2 plus the base emitter voltage of Q3 establishes the on bias through resistors R2, and R4 for Q1. The temperature coefficients of Z2, Q1 and Q3 are known for given types and voltage ratings of the devices and can be chosen to give a desired circuit temperature coefficient such as zero. D4, which is optional and may be replaced by a short, is used to create a desired temperature coefficient of the firing point of the portion of the circuit including Q1, Q2, and Q3. Because of the extreme temperature capability range of the combination of R2, R3, R4, R5, D4, Q1, Q2, Q3, and Z2 shown, this unique circuit is very useful as a spark timing circuit for combustion engines. Another unique version of this invention is created by eliminating (shorting) Z2 and moving the upper R2 connection from the base of Q3 to the cathode D1. This eliminates the voltage drop through Z2 from point B and ground. References to ground in this application are intended to be only and aid in understanding this invention in references to the drawings shown, and could refer to any common point of connection of those components or common measurement point. It should be realized that one skilled in the state of the art might substitute other semiconductor amplifying or switching devices for SCR1 in a particular application of the teaching of this invention and within the scope of this teaching, and that while the invention has been described in what is presently considered to be a preferred embodiment, many modifications will become apparent to those skilled in the art. It is intended therefore, by the appended claims to cover all such modifications as far within the true spirit and scope of the invention.

What is claimed is:

1. A system comprising:
   an internal combustion engine having a spark ignition system, said system including a connection point adapted to selectively disable said ignition;
   an alternator driven by said engine producing an AC voltage with a frequency proportional to engine speed,
   a limiter circuit responsive to said frequency to control power flow from said connection point above a desired value of said frequency, said limiter circuit including;
   electronic switch means connected to said connection point and having a gate terminal, a DC power point operating at a DC voltage, an integrating capacitor charged and discharged at a frequency fixed with said frequency of said alternator, the amplitude of said charge and discharge bearing a known relation to said DC voltage;
   means for rectifying the current from said integrating capacitor to produce a control current converted to a summation point;
   means connecting said summation point to said DC power point to produce a current at the summation point of a polarity to oppose said control current; and
   amplifying means sensitive to a selected voltage difference between said summation point and a reference point, said amplifying means connected to control power flow to said gate terminal to disable said ignition above a selected engine speed.

2. The system of claim 1 wherein said system is further controlled by a switch operated in the event of a failure in the engine throttle system.

3. The system of claim 1 wherein said means connecting said summation point to said DC power point is resistive.

4. The system of claim 3 wherein said resistance means is composed of two resistors, one of which is selected to calibrate said circuit.

5. The system of claim 1 wherein said DC voltage is stabilized by a shunt reference element.

6. The system of claim 5 wherein said hunt reference element is a zener diode.

7. The system of claim 5 having a filter capacitor connected in parallel with said shunt reference element.

8. The system of claim 1 wherein said DC voltage is stabilized by a filer capacitor.

9. The system of claim 1 containing a current limiting path from said DC voltage to said gate terminal to supply gate current sufficient to turn on said switching means.

10. The system of claim 9 wherein said amplifying means controls a shunt impedance to shunt said gate current from said gate.

11. The system of claim 10 wherein said amplifying means has an input element connected to said summation point and a common input output element connected to a reference point.

12. The system of claim 11 having a capacitor to filter the voltage at said summation point with respect to said reference point.

13. The system of claim 12 wherein the power for said DC power point is rectified from said alternator.

14. The system of claim 13 wherein said rectifier output is converted to stabilizing means for said DC power point.

15. The system of claim 13 wherein said stabilizing means includes a filter capacitor.

16. The system of claim 15 wherein said stabilizing means includes a zener diode.

* * * * *